US012631852B2

(12) United States Patent
Lin et al.

(10) Patent No.: US 12,631,852 B2
(45) Date of Patent: May 19, 2026

(54) OPTICAL ASSEMBLY WITH AIR GAP AND PROJECTION APPARATUS

(71) Applicant: Coretronic Corporation, Hsin-Chu (TW)

(72) Inventors: Shi-Wen Lin, Hsin-Chu (TW); Ming-Feng Hou, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 513 days.

(21) Appl. No.: 18/154,868

(22) Filed: Jan. 16, 2023

(65) Prior Publication Data

US 2023/0228967 A1      Jul. 20, 2023

(30) Foreign Application Priority Data

Jan. 19, 2022    (CN) .......................... 202220133620.2

(51) Int. Cl.
*G02B 7/18* (2021.01)
*G03B 21/28* (2006.01)
*G02B 13/16* (2006.01)

(52) U.S. Cl.
CPC ............. *G02B 7/181* (2013.01); *G03B 21/28* (2013.01); *G02B 13/16* (2013.01)

(58) Field of Classification Search
CPC .... G03B 21/16; G03B 21/2066; G03B 21/28; G02B 7/008; G02B 7/181
See application file for complete search history.

(56) References Cited

FOREIGN PATENT DOCUMENTS

| | | | |
|---|---|---|---|
| CN | 101311816 | | 5/2011 |
| CN | 207424511 | | 5/2018 |
| JP | 2011064886 A | * | 3/2011 |
| JP | 2011064887 A | * | 3/2011 |
| JP | 2012215656 A | * | 11/2012 |

* cited by examiner

*Primary Examiner* — Bao-Luan Q Le
(74) *Attorney, Agent, or Firm* — JCIPRNET

(57) ABSTRACT

An optical assembly includes a first prism and a second prism. The first prism has a first surface. The first surface includes a first optical region. The second prism has a second surface. The first and the second surface are disposed facing each other. The second surface includes a second optical region, in which on a first reference plane, an orthographic projection of the first optical region overlaps an orthographic projection of the second optical region, and the first reference plane is substantially parallel to the first surface or the second surface. When the optical assembly is at a first temperature, at least one of the first optical region and the second optical region is concave, and a vertical distance between the first and the second optical region gradually decreases from a first center point of the first optical region to a first edge of the first optical region.

15 Claims, 7 Drawing Sheets

OPTICAL ASSEMBLY WITH AIR GAP AND PROJECTION APPARATUS

CROSS-REFERENCE TO RELATED APPLICATION

This application claims the priority benefit of Chinese application serial no. 202220133620.2, filed on Jan. 19, 2022. The entirety of the above-mentioned patent application is hereby incorporated by reference herein and made a part of this specification.

BACKGROUND

Technical Field

This disclosure relates to an optical element and an electronic device, in particular to an optical assembly and a projection apparatus.

Description of Related Art

A projection apparatus is a display apparatus used to generate large-scale images, with the evolution of technology and innovation, has been constantly progressing. The imaging principle of a projection apparatus is to convert the illumination beam generated by the illumination system into an image beam through a light valve, and then to project the image beam through the projection lens onto the projection target (e.g., a screen or a wall) to form a projected image.

In conventional technology, total internal reflection (TIR or RTIR) prisms are often used to design light path in Digital Light Processing (DLP) projection apparatuses. A total internal reflection prism is composed of two prisms and an air gap, and the effect of passing through or reflection is created by the change of light transmission medium and the difference of light incidence angle, so that the light can enter from one prism and be reflected to the digital micromirror device (DMD), and then be reflected by the digital micromirror device, pass through the other prism, and enter the lens.

In order to achieve the above light path design requirements, there must be an air gap between the two prisms to achieve this effect, so the air gap is very important for the total internal reflection prism. In conventional technology, the air gap is usually formed by the plane of the two prisms form an equally spaced interlayer through the glass beads (spacers). In order to avoid the optical path difference in this air gap, which causes the deterioration of the quality of the projected image, the spacing should be designed to be less than a certain height.

However, in practice, when the light passes through the total internal reflection prism, the coating on the prism and the transmittance of the prism may cause some energy loss in the process of light passing through the prism, and the energy loss will be converted to heat energy and absorbed by the coating and the prism. In this way, the heat residue will cause a temperature difference between the inside and outside of the total internal reflection prism, which will cause the total internal reflection prism to begin to expand thermally. The expansion of the total internal reflection prism will cause the air gap between the two prisms to start deforming, which in turn will cause the original equally spaced air gap to deform and the internal spacing starts to shrink. When the air gap is less than a certain thickness, the light will begin to be interfered during the process of passing through, and this phenomenon of the interference of the light will lead to color spots in the projected image. If the brightness of the projection is further increased, it will cause the deformation of the total internal reflection prism to intensify and the air gap will disappear. At this time, darks spot will appear in the projected image, and the above phenomenon is the Newton ring generated by the interference of the light.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides an optical assembly and a projection apparatus, capable of avoiding a phenomenon of color spots on a projected image when the light passes through the optical assembly.

Other purposes and advantages of the disclosure can be further understood from the technical features disclosed by the disclosure.

In order to achieve one or part or all of the purposes or other purposes, the disclosure provides an optical assembly, which includes a first prism and a second prism. The first prism has a first surface. The first surface includes a first optical region. The second prism has a second surface. The first surface and the second surface are disposed facing each other. The second surface includes a second optical region, in which on a first reference plane, an orthographic projection of the first optical region overlaps an orthographic projection of the second optical region, and the first reference plane is substantially parallel to the first surface or the second surface. When the optical assembly is at a first temperature, at least one of the first optical region and the second optical region is concave, and a vertical distance between the first optical region and the second optical region gradually decreases from a first center point of the first optical region to a first edge of the first optical region.

In order to achieve one or part or all of the purposes or other purposes, the disclosure further provides a projection apparatus, which includes an illumination system, a light valve, a projection lens, and an optical assembly. The illumination system is configured to provide an illumination beam. The light valve is disposed on a transmission path of the illumination beam, and is configured to convert the illumination beam into an image beam. The projection lens is disposed on a transmission path of the image beam, and is configured to project the image beam out of the projection apparatus. The optical assembly is disposed on the transmission path of the image beam, and is located between the light valve and the projection lens. The optical assembly includes a first prism and a second prism. The first prism has a first surface. The first surface includes a first optical region. The second prism has a second surface. The first surface and the second surface are disposed facing each other. The second surface includes a second optical region, in which on a first reference plane, an orthographic projection of the first optical region overlaps an orthographic projection of the second optical region, and the first reference plane is substantially parallel to the first surface or the second surface. When the optical assembly is at a first temperature, at least one of the first optical region and the second optical region is concave, and a vertical distance between the first optical region and the second optical region gradually decreases from a first center point of the first optical region to a first edge of the first optical region.

Based on the above, the embodiments of the disclosure have at least one of the following advantages or effects. In the optical assembly and the projection apparatus of the disclosure, the first surface of the first prism of the optical assembly includes the first optical region, the second surface of the second prism includes the second optical region. When the optical assembly is at the first temperature, at least one of the first optical region and the second optical region is concave. The vertical distance between the first optical region and the second optical region gradually decreases from the first center point of the first optical region to the first edge of the first optical region. As a result, the vertical distance from the first optical region to the second optical region of the optical assembly may be kept above a certain dimension even though the vertical distance is shortened during the operation of the projection apparatus. In this way, the problem of small thickness of the air gap caused by thermal deformation of the optical assembly after heating up during the operation of the projection apparatus may be avoided, and the phenomenon of color spots on the projected image may be prevented.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWING

The accompanying drawings are included to provide a further understanding of the disclosure, and are incorporated in and constitute a part of this specification. The drawings illustrate examples of the disclosure and, together with the description, serve to explain the principles of the disclosure.

FIG. 5 shows a schematic side view and a partial enlarged view of the optical assembly of FIG. 2A after an image beam is passed through.

FIG. 6 shows a schematic side view and a partial enlarged view of an optical assembly according to another embodiment of the disclosure after an image beam is passed through.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component "component is directly "adjacent to" "B" component or one or more additional components are between "A" component and "B" component. Accordingly, the drawings and descriptions will be regarded as illustrative in nature and not as restrictive.

Figure 1:
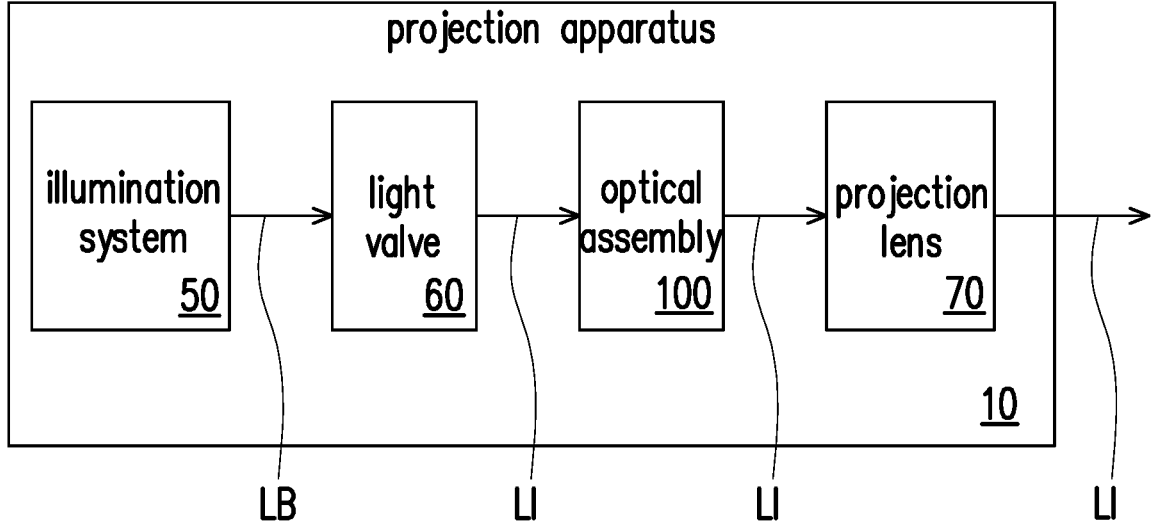
FIG. 1 shows a schematic view of a projection apparatus according to an embodiment of the disclosure.

FIG. 1 shows a schematic view of a projection apparatus according to an embodiment of the disclosure. Referring to FIG. 1, the embodiment provides a projection apparatus 10 including an illumination system 50, a light valve 60, a projection lens 70, and an optical assembly 100. The illumination system 50 is configured to provide an illumination beam LB. The light valve 60 is disposed on a transmission path of the illumination beam LB, and is configured to convert the illumination beam LB into an image beam LI. The projection lens 70 is disposed on a transmission path of the image beam LI, and is configured to project the image beam LI out of the projection apparatus 10 to a projection target (not shown), such as a screen or a wall.

The illumination system 50 is configured to provide the illumination beam LB. For example, according to this embodiment, the illumination system 50 includes, for example, multiple light-emitting elements, wavelength conversion elements, homogenizing elements, filter elements, and multiple light splitting and combining elements to provide light of different wavelengths to form the illumination beam LB. The light-emitting elements are, for example, light-emitting diodes (LEDs) or laser diodes (LDs). However, the disclosure provides no limitation to the type or form of the illumination system 50 in the projection apparatus 10. The detailed structure and implementation of the illumination system 50 can be obtained from the common knowledge in the technical field with sufficient teaching, suggestion and implementation, so no further description is incorporated herein.

According to this embodiment, the light valve 60 is, for example, a reflective light modulator such as a liquid crystal on silicon panel (LCOS panel) or a digital micro-mirror device (DMD). In some embodiments, the light valve 60 may also be a transmissive light modulator such as a transparent liquid crystal panel, an electro-optical modulator, a maganeto-optic modulator and an acousto-optic modulator (AOM). The disclosure provides no limitation to the form and type of the light valve 60. The detailed steps and implementation of the method for the light valve 60 to convert the illumination beam LB into the image beam LI can be obtained from the common knowledge in the technical field with sufficient teaching, suggestion and implementation, and therefore no further description is incorporated herein. According to this embodiment, a number of the light valve 60 is one, for example, a projection apparatus 10 using a single digital micro-mirror element, but in other embodiments there may be more than one light valve 60, and the disclosure is not limited thereto.

The projection lens 70 is, for example, a combination of one or more optical lenses with refractive power, and includes, for example, a non-planar lens such as a biconcave lens, a biconvex lens, a concave-convex lens, a convex-concave lens, a plano-convex lens, a plano-concave lens, etc., or various combinations thereof. In one embodiment, the projection lens 70 may further include a planar optical lens, which projects the image beam LI from the light valve 60 to the projection target in a reflective manner. The disclosure provides no limitation to the form and type of the projection lens 70.

Figure 2A:
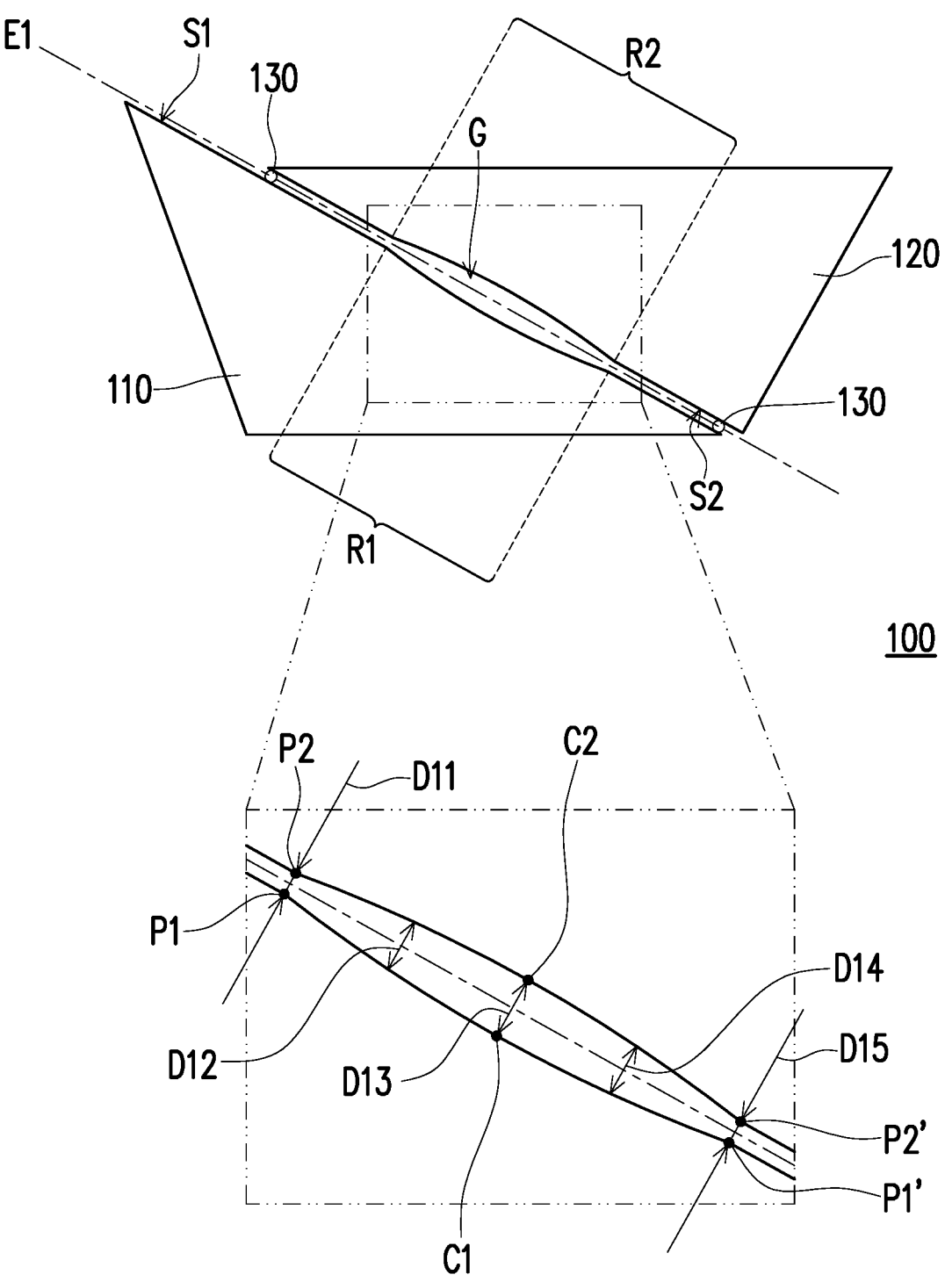
FIG. 2A shows a schematic side view and a partial enlarged view of an optical assembly according to an embodiment of the disclosure.
Figure 2B:
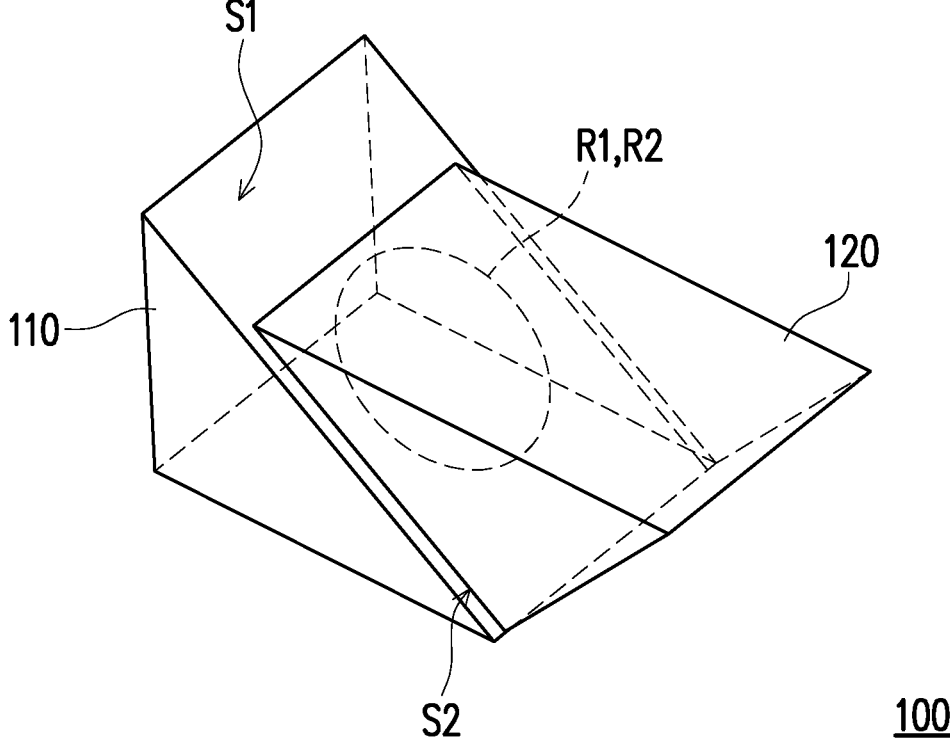
FIG. 2B shows a three-dimensional perspective view of the optical assembly of FIG. 2A.
Figure 3:
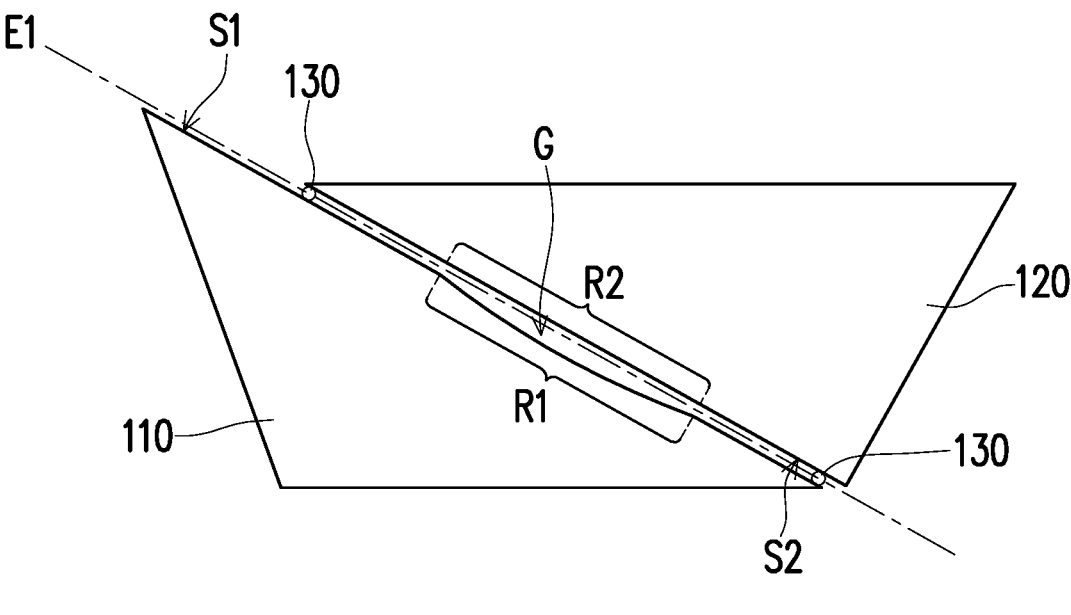
FIG. 3 and FIG. 4 show schematic side views of optical assemblies according to different embodiments, respectively.
Figure 4:
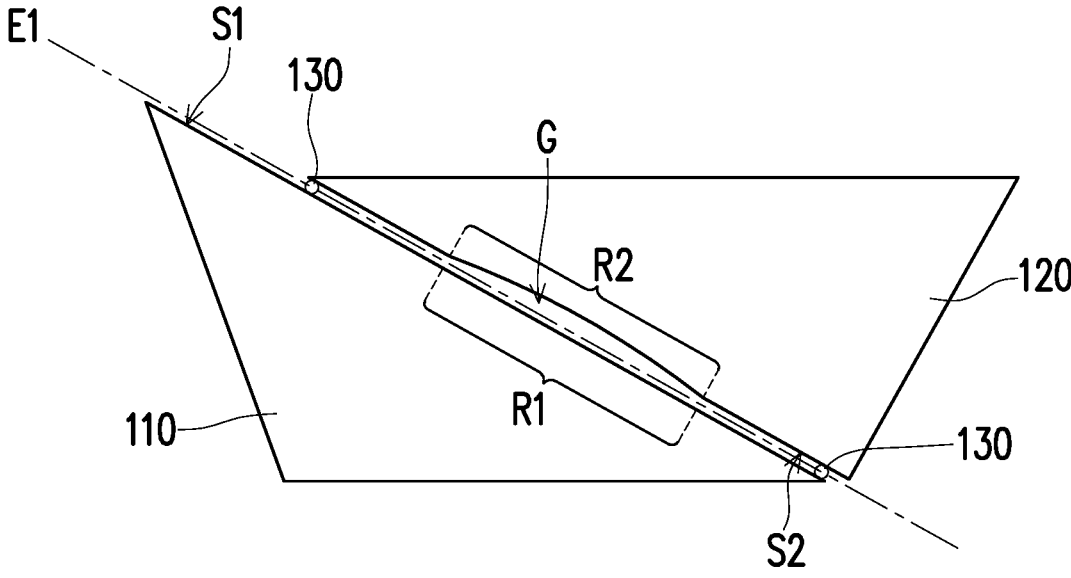

FIG. 2A shows a schematic side view and a partial enlarged view of an optical assembly according to an embodiment of the disclosure. FIG. 2B shows a three-dimensional perspective view of the optical assembly of FIG. 2A. FIG. 3 and FIG. 4 show schematic side views of optical assemblies according to different embodiments, respectively. Referring to FIG. 1, FIG. 2A, and FIG. 2B at the same time, the optical assembly 100 is, for example, a total internal reflection prism (TIR prism) formed by two triangular prisms to cause total reflection of the illumination beam LB input to the optical assembly 100 to transmit the illumination beam LB to the light valve 60 and to pass the image beam LI transmitted from the light valve 60 to the projection lens 70. Further, the optical assembly 100 includes a first prism 110 and a second prism 120, the second prism 120 is disposed on the first prism 110, and there is a spacing between the first prism 110 and the second prism 120 to form an air gap G. The first prism 110 has a first surface S1, the second prism 120 has a second surface S2, and the first surface S1 and the second surface S2 are disposed facing each other.

The first surface S1 includes a first optical region R1, and the second surface S2 includes a second optical region R2. On a first reference plane E1, an orthographic projection of the first optical region R1 overlaps an orthographic projection of the second optical region R2, and the first reference plane E1 is substantially parallel to the first surface S1 or the second surface S2. According to this embodiment, the shape of the region covered by the first optical region R1 and the second optical region R2 is, for example, circular or elliptical, but the disclosure is not limited thereto. At a first temperature, at least one of the first optical region R1 and the second optical region R2 is concave. For example, the first temperature is the temperature of the projection apparatus 10 not activated. According to the embodiments of FIG. 2A and FIG. 2B, the first optical region R1 and the second optical region R2 are both concave. Specifically, as shown in the schematic side view shown in FIG. 2A, the first optical region R1 has a first center point C1, a first edge P1, and a first edge P1', and the first center point C1 is located between the first edge P1 and the first edge P1'. The second optical region R2 has a second center point C2, a second edge P2, and a second edge P2', and the second center point C2 is located between the second edge P2 and the second edge P2'. A vertical distance between the first optical region R1 and the second optical region R2 gradually decreases from the first center point C1 of the first optical region R1 to the first edge P1 of the first optical region R1. Correspondingly, the vertical distance between the first optical region R1 and the second optical region R2 also gradually decreases from the first center point C1 of the first optical region R1 to the other first edge P1' of the first optical region R1. Further, a vertical distance D13 between the first center point C1 of the first optical region R1 and the second center point C2 of the second optical region R2 is greater than a vertical distance D11 between the first edge P1 of the first optical region R1 and the second edge P2 of the second optical region R2. The vertical distance D13 between the first center point C1 of the first optical region R1 and the second center point C2 of the second optical region R2 is also greater than a vertical distance D15 between the other first edge P1' of the first optical region R1 and the other second edge P2' of the second optical region R2. That is to say, the distance between the first optical region R1 and the second optical region R2 gradually decreases from the center to the edge.

In addition, as shown in the partial enlarged view in FIG. 2A, at the first temperature, the vertical distance between the first optical region R1 and the second optical region R2 varies continuously. Specifically, a vertical distance D12 from any position between the first edge P1 and the first center point C1 to the corresponding position between the second edge P2 and the second center point C2 is smaller than the vertical distance D13 from the first center point C1 to the second center point C2, and greater than the vertical distance D11 from the first edge P1 to the second edge P2. Correspondingly, a vertical distance D14 from any position between the first edge P1' and the first center point C1 to the corresponding position between the second edge P2' and the second center point C2 is smaller than the vertical distance D13 from the first center point C1 to the second center point C2, and greater than the vertical distance D15 from the first edge P1' to the second edge P2'.

However, according to different embodiments, the first optical region R1 may also be designed to be concave and the second optical region R2 to be plane, as shown in FIG. 3. Alternatively, the first optical region R1 may also be designed to be plane and the second optical region R2 to be concave, as shown in FIG. 4, but the disclosure is not limited thereto. According to the embodiments of FIG. 3 and FIG. 4, the vertical distance between the first optical region R1 and the second optical region R2 also gradually decreases from the first center point C1 (as shown in FIG. 2A) of the first optical region R1 to the first edge P1 (as shown in FIG. 2A) of the first optical region R1.

Referring to FIG. 2A, FIG. 3, and FIG. 4 at the same time, the optical assembly 100 may further include at least one spacer 130. The at least one spacer 130 is disposed between the first surface S1 and the second surface S2, and configured to separate the first prism 110 and the second prism 120 to form the air gap G. According to this embodiment, a number of the spacer 130 is two, and the two spacers 130 are, for example, of the same size. The two spacers 130 are disposed at an edge of the first surface S1 or an edge of the second surface S2, and directly connect the first surface S1 and the second surface S2. However, according to different embodiments, the two spacers 130 may be disposed at the first edge P1 and the first edge P1' of the first optical region R1, respectively. In addition, the disclosure provides no limitation to the number, type or shape of the spacer 130, and multiple spacers of different types or shapes may be used at the same time, as long as the air gap G can be formed between the first prism 110 and the second prism 120. According to one embodiment, the spacer 130 may be omitted, and the first prism 110 and the second prism 120 are respectively fixed on casing of the projection apparatus 10 by different structures to form the air gap G, and the disclosure is not limited thereto.

Figure 5:
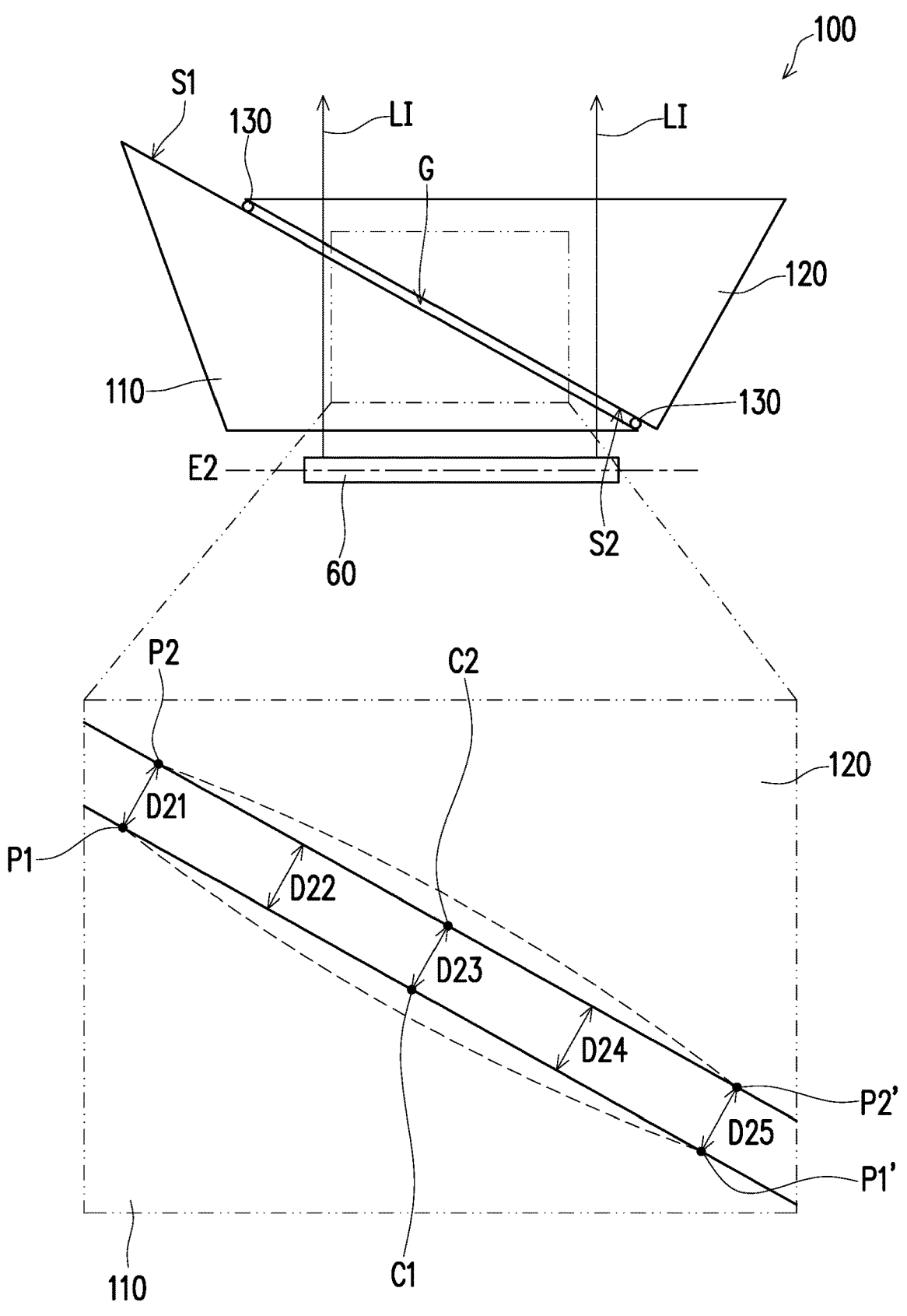

FIG. 5 shows a schematic side view and a partial enlarged view of the optical assembly of FIG. 2A after an image beam is passed through. Referring to FIG. 2A, FIG. 2B and FIG. 5, according to this embodiment, a vertical distance D23 from the first center point C1 of the first optical region R1 to the second center point C2 of the second optical region R2 of the optical assembly 100 at a second temperature is smaller than the vertical distance D13 from the first center point C1 of the first optical region R1 to the second center point C2 of the second optical region R2 of the optical assembly 100 at the first temperature, in which the second temperature is greater than the first temperature. It should be noted that, as shown in the partial enlarged view in FIG. 5, dashed lines between the first edge P1 and the first edge P1' and dashed lines between the second edge P2 and the second edge P2' represent contours of the first optical region R1 and the second optical region R2 of the optical assembly 100 at the first temperature, respectively, to facilitate comparison of the contours of the first optical region R1 and the second optical region R2 after the first temperature is changed to the second temperature. For example, the second temperature is the temperature of the projection apparatus 10 in operation. In other words, when the projection apparatus 10 is in operation, the light valve 60 provides the image beam LI passing through the first optical region R1 and the second optical region R2 of the optical assembly 100, so that a material in the first optical region R1 and the second optical region R2 is heated to the second temperature and expanded to shorten the vertical distance between the first center point C1 and the second center point C2, as shown in the partial enlargement in FIG. 5. On the other hand, on a second reference plane E2, an orthographic projection of the first center point C1 of the first optical region R1 overlaps an orthographic projection of the light valve 60, and the second reference plane E2 is parallel to the light valve 60.

According to this embodiment, in order to achieve a desired thermal expansion deformation effect, the optical assembly 100 may be further designed to satisfy a relation (a) at the first temperature: $1345*(B/10000)*(C/7.1\times10^{-6})$ $\leq D \leq 1644*(B/10000)*(C/7.1\times10^{-6})$, where B is brightness of the image beam LI, C is a thermal expansion coefficient of the optical assembly 100, and D is a difference between the vertical distance from the first center point C1 of the first optical region R1 to the second center point C2 of the second optical region R2 and a vertical distance from the first edge P1 of the first optical region R1 to the second edge P2 of the second optical region R2 (e.g., equivalent to the difference between the vertical distance D13 between the first center point C1 and the second center point C2 and a vertical distance D11 between the first edge P1 and the second edge P2 as shown in FIG. 2A).

Further, the relation (a) is to set the difference D of the vertical distances at the first temperature to a distance of 5 to 6 Newton rings to avoid a thickness of the air gap G becoming too small at the second temperature, and at this setting, a relation (b) can be used for calculation first.

Relation (b): $2d=(m+1/2)\lambda$, where d is a difference between the vertical distance between the first center point C1 and the second center point C2 and the vertical distance between the first edge P1 and the second edge P2 without taking into account the brightness of the image beam LI and the thermal expansion coefficient of the optical assembly 100, m is a number of Newton rings, in which m is 4 when the Newton ring is 5, m is 5 when the Newton ring is 6, and $\lambda$ is substituted for a wavelength of detection light, 598 nm. The difference d between the vertical distances corresponding to 5 Newton rings is 1345 and the difference d between the vertical distances corresponding to 6 Newton rings is 1644 by using the relation (b). The difference d between the vertical distances in these two cases is the parameter 1345 and 1644 in the relation (a), and the relation (a) is formed by converting the brightness of the image beam LI and the thermal expansion coefficient of the optical assembly 100. According to a preferred embodiment, the difference D of the vertical distances satisfying the relation (a) enables the first optical region R1 of the first surface S1 of the first prism 110 and the second optical region R2 of the second surface S2 of the second prism 120 to be nearly parallel at the second temperature, so as to achieve an effect of keeping the thickness of the air gap G above a certain dimension.

As shown in FIG. 5, in the case where the two spacers 130 are of the same size so that the first surface S1 are substantially parallel to the second surface S2, according to a preferred embodiment, at the second temperature, the vertical distance D23 between the first center point C1 of the first optical region R1 and the second center point C2 of the second optical region R2 is equal to the vertical distance D21 between the first edge P1 of the first optical region R1 and the second edge P2 of the second optical region R2, and the vertical distance D23 is also equal to a vertical distance D25 between the other first edge P1' of the first optical region R1 and the other second edge P2' of the second optical region R2. Further, at the second temperature, a vertical distance from any position between the first edge P1 and the first center point C1 to the corresponding position between the second edge P2 and the second center point C2 is marked as a vertical distance D22. A vertical distance from any position between the first edge P1' and the first center point C1 to the corresponding position between the second edge P2' and the second center point C2 is marked as a vertical distance D24. The vertical distance D21, the vertical distance D22, the vertical distance D23, the vertical distance D24, and vertical distance D25 are equal distances.

Figure 6:
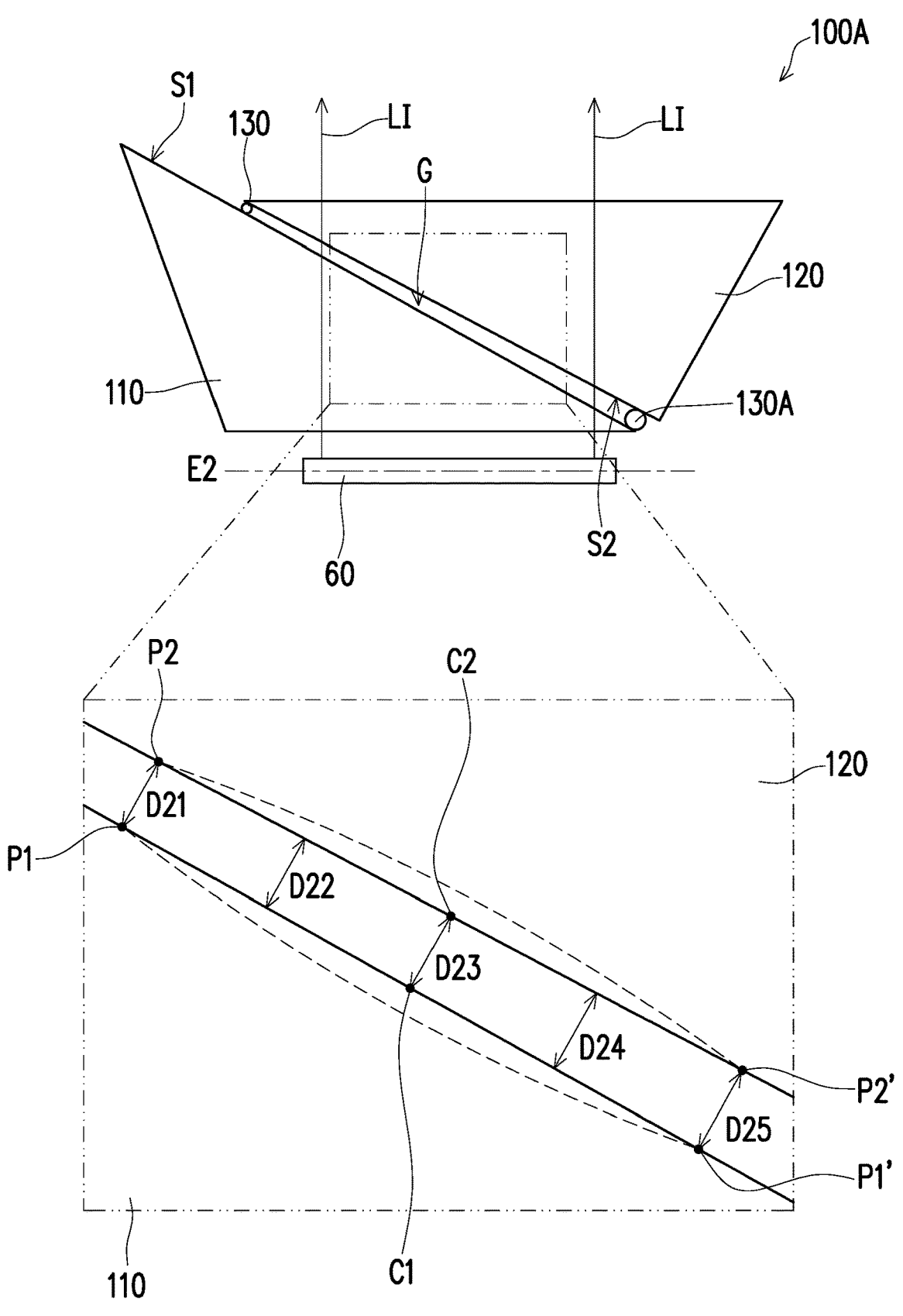

FIG. 6 shows a schematic side view and a partial enlarged view of an optical assembly according to another embodiment of the disclosure after an image beam is passed through. An optical assembly 100A according to the embodiment in FIG. 6 is similar to the optical assembly 100 in FIG. 5, except that the optical assembly 100A includes a spacer 130 and a spacer 130A. The spacer 130 and the spacer 130A are not of the same size, such that the first surface S1 of the first prism 110 is not parallel to the second surface S2 of the second prism 120. For example, according to this embodiment, a diameter of the spacer 130A is larger than a diameter of the spacer 130, so that at the second temperature, the vertical distance D21, the vertical distance D22, the vertical distance D23, the vertical distance D24, and the vertical distance D25 are not equal distances. The vertical distance nearer to the smaller spacer is smaller, and the vertical distance nearer to the larger spacer is larger. For example, a diameter of the spacer 130A is larger than a diameter of the spacer 130 in FIG. 6, so that the vertical distance D25>the vertical distance D24>the vertical distance D23>the vertical distance D22>the vertical distance D21.

Figure 7:
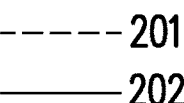
FIG. 7 and FIG. 8 show air space curves of a conventional optical assembly and an optical assembly according to an embodiment of the disclosure after an image beam passes through, respectively.
Figure 7:
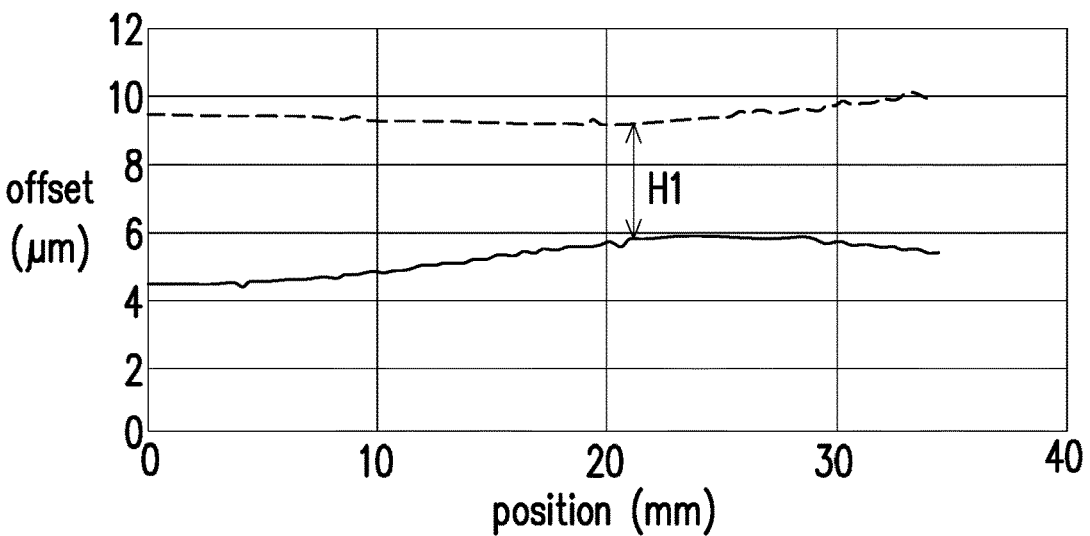
Figure 8:
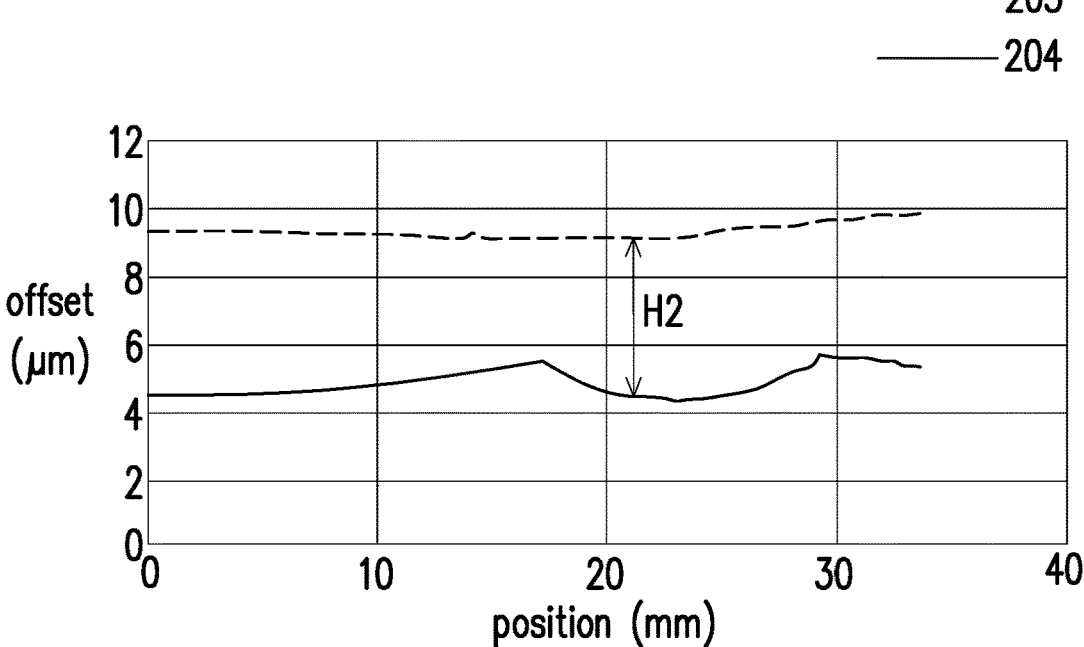

FIG. 7 and FIG. 8 show air space curves of a conventional optical assembly and an optical assembly according to an embodiment of the disclosure after an image beam passes through, respectively. Referring to FIG. 5, FIG. 7, and FIG. 8, FIG. 7 and FIG. 8 respectively show the variation of the vertical distances H1 and H2 of the first surface S1 and the second surface S2 of different optical assemblies. A curve 201 and a curve 202 in FIG. 7 respectively show offset of positions of the first surface S1 and the second surface S2 on different regions during the operation of the projection apparatus using a conventional total reflection prism (i.e., the first surface S1 and the second surface S2 are substantially plane as a whole at the first temperature). A distance between the curve 201 and the curve 202 may represent a distance between the first surface S1 and the second surface S2. A curve 203 and a curve 204 in FIG. 8 respectively show offset of the positions of the first surface S1 and the second surface S2 on different regions during the operation of the projection apparatus using the optical assembly 100 according to the embodiment of FIG. 5. A distance between the curve 203 and the curve 204 may represent the distance between the first surface S1 and the second surface S2. An original distance between the first surface S1 and the second surface S2 (i.e., the thickness of the air gap at the first temperature) in FIG. 7 is 5 μm. As shown in FIG. 7 and FIG. 8, the vertical distance H1 of the first surface S1 and the second surface S2 of the projection apparatus 10 in operation using the conventional total reflection prism is about 3.4 μm. Compared with the conventional total reflection prism, the vertical distance H2 between the first surface S1 and the second surface S2 of the optical assembly 100 according to this embodiment at corresponding positions during operation of the projection apparatus 10 is 4.9 μm, which is closer to an original air gap thickness of 5 μm. As a result, during the operation of the projection apparatus 10 according to this embodiment, the vertical distance between the first optical region R1 and the second optical region R2 of the optical assembly 100 may be kept above a certain dimension even though the vertical distance is shortened. In this way, the problem of small thickness of the air gap G caused by thermal deformation of the optical assembly 100 after heating up during the operation of the projection apparatus 10 may be avoided, and the phenomenon of color spots on the projected image may be prevented.

To sum up, the embodiments of the disclosure have at least one of the following advantages or effects. In the optical assembly and the projection apparatus of the disclosure, the first surface of the first prism of the optical assembly includes the first optical region, the second surface of the second prism includes the second optical region. When the optical assembly is at the first temperature, at least one of the first optical region and the second optical region is concave. The vertical distance between the first optical region and the second optical region gradually decreases from the first center point of the first optical region to the first edge of the first optical region. As a result, the vertical distance from the first optical region to the second optical region of the optical assembly may be kept above a certain dimension even though the vertical distance is shortened during the operation of the projection apparatus. In this way, the problem of small thickness of the air gap caused by thermal deformation of the optical assembly after heating up during the operation of the projection apparatus may be avoided, and the phenomenon of color spots on the projected image may be prevented.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An optical assembly comprising:

a first prism having a first surface, the first surface comprising a first optical region; and a second prism having a second surface, the first surface and the second surface disposed facing each other, and the second surface comprising a second optical region, wherein on a first reference plane, an orthographic projection of the first optical region overlaps an orthographic projection of the second optical region, and the first reference plane is substantially parallel to the first surface or the second surface, wherein when the optical assembly is at a first temperature, at least one of the first optical region and the second optical region is concave, and a vertical distance between the first optical region and the second optical region gradually decreases from a first center point of the first optical region to a first edge of the first optical region, wherein the optical assembly satisfies the following relation at the first temperature: 1345*(B/10000)*(C/7.1×

$10^{-6})\leq D\leq 1644*(B/10000)*(C/7.1\times10^{-6})$, where B is brightness of an image beam, C is a thermal expansion coefficient of the optical assembly, and D is a difference between a vertical distance from the first center point of the first optical region to a second center point of the second optical region and a vertical distance from the first edge of the first optical region to a second edge of the second optical region.

2. The optical assembly according to claim 1, wherein the vertical distance from the first center point of the first optical region to the second center point of the second optical region of the optical assembly at a second temperature is smaller than the vertical distance from the first center point of the first optical region to the second center point of the second optical region of the optical assembly at the first temperature, wherein the second temperature is greater than the first temperature.

3. The optical assembly according to claim 1, wherein when the optical assembly is at a second temperature, the vertical distance from the first center point of the first optical region to the second center point of the second optical region is equal to the vertical distance from the first edge of the first optical region to the second edge of the second optical region, wherein the second temperature is greater than the first temperature.

4. The optical assembly according to claim 1 further comprising:
 at least one spacer disposed between the first surface and the second surface.

5. The optical assembly according to claim 4, wherein the at least one spacer directly connects the first surface and the second surface.

6. The optical assembly according to claim 4, wherein the at least one spacer is disposed at the first edge of the first optical region.

7. The optical assembly according to claim 4, wherein a number of the at least one spacer is plural, and the type or appearance of the spacers are different.

8. A projection apparatus comprising:
 an illumination system configured to provide an illumination beam;
 a light valve disposed on a transmission path of the illumination beam, and configured to convert the illumination beam into an image beam;
 a projection lens disposed on a transmission path of the image beam, and configured to project the image beam out of the projection apparatus; and
 an optical assembly disposed on the transmission path of the image beam, and located between the light valve and the projection lens, wherein the optical assembly comprises:
 a first prism having a first surface, the first surface comprising a first optical region; and
 a second prism having a second surface, the first surface and the second surface disposed facing each other, and the second surface comprising a second optical region, wherein on a first reference plane, an orthographic projection of the first optical region overlaps an orthographic projection of the second optical region, and the first reference plane is substantially parallel to the first surface or the second surface,
 wherein when the optical assembly is at a first temperature, at least one of the first optical region and the second optical region is concave, and a vertical distance between the first optical region and the second optical region gradually decreases from a first center point of the first optical region to a first edge of the first optical region,
 wherein the optical assembly satisfies the following relation at the first temperature: $1345*(B/10000)*(C/7.1\times10^{-6})\leq D\leq 1644*(B/10000)*(C/7.1\times10^{-6})$, where B is brightness of the image beam, C is a thermal expansion coefficient of the optical assembly, and D is a difference between a vertical distance from the first center point of the first optical region to a second center point of the second optical region and a vertical distance from the first edge of the first optical region to a second edge of the second optical region.

9. The projection apparatus according to claim 8, wherein the vertical distance from the first center point of the first optical region to the second center point of the second optical region of the optical assembly at a second temperature is smaller than the vertical distance from the first center point of the first optical region to the second center point of the second optical region of the optical assembly at the first temperature, wherein the second temperature is greater than the first temperature.

10. The projection apparatus according to claim 8, wherein when the optical assembly is at a second temperature, the vertical distance from the first center point of the first optical region to the second center point of the second optical region is equal to the vertical distance from the first edge of the first optical region to the second edge of the second optical region, wherein the second temperature is greater than the first temperature.

11. The projection apparatus according to claim 8, wherein the optical assembly further comprises at least one spacer disposed between the first surface and the second surface.

12. The projection apparatus according to claim 11, wherein the at least one spacer directly connects the first surface and the second surface.

13. The projection apparatus according to claim 11, wherein the at least one spacer is disposed at the first edge of the first optical region.

14. The projection apparatus according to claim 11, wherein a number of the at least one spacer is plural, and the type or appearance of the spacers are different.

15. The projection apparatus according to claim 8, wherein on a second reference plane, an orthographic projection of the first center point of the first optical region overlaps an orthographic projection of the light valve, and the second reference plane is parallel to the light valve.

* * * * *